(12) United States Patent
Khenkin et al.

(10) Patent No.: US 12,244,253 B2
(45) Date of Patent: Mar. 4, 2025

(54) RESTRICTING UNDESIRED MOVEMENT OF A HAPTIC ACTUATOR

(71) Applicant: Cirrus Logic International Semiconductor Ltd., Edinburgh (GB)

(72) Inventors: Aleksey Khenkin, Austin, TX (US); Steve Proffitt, Austin, TX (US); Marco Janko, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 924 days.

(21) Appl. No.: 16/850,843

(22) Filed: Apr. 16, 2020

(65) Prior Publication Data

US 2021/0328535 A1 Oct. 21, 2021

(51) Int. Cl.
*H02P 25/034* (2016.01)
*G08B 6/00* (2006.01)

(52) U.S. Cl.
CPC .............. *H02P 25/034* (2016.02); *G08B 6/00* (2013.01)

(58) Field of Classification Search
CPC ................................. H02P 25/034; G08B 6/00
USPC ......................................................... 318/114
See application file for complete search history.

(56) References Cited

U.S. PATENT DOCUMENTS

| | | | |
|---|---|---|---|
| 3,686,927 A | 8/1972 | Scharton | |
| 4,902,136 A | 2/1990 | Mueller et al. | |
| 5,374,896 A | 12/1994 | Sato et al. | |
| 5,684,722 A | 11/1997 | Thorner et al. | |
| 5,748,578 A | 5/1998 | Schell | |
| 5,857,986 A | 1/1999 | Moriyasu | |
| 6,050,393 A | 4/2000 | Murai et al. | |
| 6,278,790 B1 | 8/2001 | Davis et al. | |
| 6,294,891 B1 * | 9/2001 | McConnell | G05B 5/01 700/32 |
| 6,332,029 B1 | 12/2001 | Azima et al. | |
| 6,388,520 B2 | 5/2002 | Wada et al. | |
| 6,567,478 B2 | 5/2003 | Oishi et al. | |
| 6,580,796 B1 | 6/2003 | Kuroki | |
| 6,683,437 B2 | 1/2004 | Tierling | |
| 6,703,550 B2 | 3/2004 | Chu | |
| 6,762,745 B1 | 7/2004 | Braun et al. | |
| 6,768,779 B1 | 7/2004 | Nielsen | |
| 6,784,740 B1 | 8/2004 | Tabatabaei | |

(Continued)

FOREIGN PATENT DOCUMENTS

AU 2002347829 4/2003
CN 103165328 A 6/2013
(Continued)

OTHER PUBLICATIONS

International Search Report and Written Opinion of the International Searching Authority, International Application No. PCT/US2020/024864, mailed Jul. 6, 2020.
(Continued)

*Primary Examiner* — Jorge L Carrasquillo
(74) *Attorney, Agent, or Firm* — Jackson Walker L.L.P.

(57) ABSTRACT

A method for minimizing undesired movement of a moving mass of an electromagnetic load may include detecting undesired movement of the moving mass based on real-time measurements of one or more parameters associated with the electromagnetic load and, responsive to detecting undesired movement of the moving mass, affecting a signal applied to the moving mass to reduce the undesired movement.

26 Claims, 4 Drawing Sheets

(56) References Cited

U.S. PATENT DOCUMENTS

| | | |
|---|---|---|
| 6,906,697 B2 | 6/2005 | Rosenberg |
| 6,995,747 B2 | 2/2006 | Casebolt et al. |
| 7,042,286 B2 | 5/2006 | Meade et al. |
| 7,154,470 B2 | 12/2006 | Tierling |
| 7,277,678 B2 | 10/2007 | Rozenblit et al. |
| 7,301,094 B1 | 11/2007 | Noro et al. |
| 7,333,604 B2 | 2/2008 | Zernovizky et al. |
| 7,392,066 B2 | 6/2008 | Hapamas |
| 7,456,688 B2 | 11/2008 | Okazaki et al. |
| 7,623,114 B2 | 11/2009 | Rank |
| 7,639,232 B2 | 12/2009 | Grant et al. |
| 7,777,566 B1 | 8/2010 | Drogi et al. |
| 7,791,588 B2 * | 9/2010 | Tierling .................. G06F 3/016 345/204 |
| 7,825,838 B1 | 11/2010 | Srinivas et al. |
| 7,979,146 B2 | 7/2011 | Ullrich et al. |
| 8,068,025 B2 | 11/2011 | Devenyi et al. |
| 8,098,234 B2 | 1/2012 | Lacroix et al. |
| 8,102,364 B2 | 1/2012 | Tierling |
| 8,325,144 B1 | 12/2012 | Tierling et al. |
| 8,427,286 B2 | 4/2013 | Grant et al. |
| 8,441,444 B2 | 5/2013 | Moore et al. |
| 8,466,778 B2 | 6/2013 | Hwang et al. |
| 8,480,240 B2 | 7/2013 | Kashiyama |
| 8,572,293 B2 | 10/2013 | Cruz-Hernandez et al. |
| 8,572,296 B2 | 10/2013 | Cruz-Hernandez et al. |
| 8,593,269 B2 | 11/2013 | Grant et al. |
| 8,648,659 B2 | 2/2014 | Oh et al. |
| 8,648,829 B2 | 2/2014 | Shahoian et al. |
| 8,754,757 B1 | 6/2014 | Ullrich et al. |
| 8,754,758 B1 | 6/2014 | Ullrich et al. |
| 8,947,216 B2 | 2/2015 | Da Costa et al. |
| 8,981,915 B2 | 3/2015 | Birnbaum et al. |
| 8,994,518 B2 | 3/2015 | Gregorio et al. |
| 9,019,087 B2 | 4/2015 | Bakircioglu et al. |
| 9,030,428 B2 | 5/2015 | Fleming |
| 9,063,570 B2 | 6/2015 | Weddle et al. |
| 9,070,856 B1 | 6/2015 | Rose et al. |
| 9,083,821 B2 | 7/2015 | Hughes |
| 9,092,059 B2 | 7/2015 | Bhatia |
| 9,117,347 B2 | 8/2015 | Matthews |
| 9,128,523 B2 | 9/2015 | Buuck et al. |
| 9,164,587 B2 | 10/2015 | Da Costa et al. |
| 9,196,135 B2 | 11/2015 | Shah et al. |
| 9,248,840 B2 | 2/2016 | Truong |
| 9,326,066 B2 | 4/2016 | Klippel |
| 9,329,721 B1 | 5/2016 | Buuck et al. |
| 9,354,704 B2 | 5/2016 | Lacroix et al. |
| 9,368,005 B2 | 6/2016 | Cruz-Hernandez et al. |
| 9,489,047 B2 | 11/2016 | Jiang et al. |
| 9,495,013 B2 | 11/2016 | Underkoffler et al. |
| 9,507,423 B2 | 11/2016 | Gandhi et al. |
| 9,513,709 B2 | 12/2016 | Gregorio et al. |
| 9,520,036 B1 | 12/2016 | Buuck |
| 9,588,586 B2 | 3/2017 | Rihn |
| 9,640,047 B2 | 5/2017 | Choi et al. |
| 9,652,041 B2 | 5/2017 | Jiang et al. |
| 9,696,859 B1 | 7/2017 | Heller et al. |
| 9,697,450 B1 | 7/2017 | Lee |
| 9,715,300 B2 | 7/2017 | Sinclair et al. |
| 9,740,381 B1 | 8/2017 | Chaudhri et al. |
| 9,842,476 B2 | 12/2017 | Rihn et al. |
| 9,864,567 B2 | 1/2018 | Seo |
| 9,881,467 B2 | 1/2018 | Levesque |
| 9,886,829 B2 | 2/2018 | Levesque |
| 9,946,348 B2 | 4/2018 | Ullrich et al. |
| 9,947,186 B2 | 4/2018 | Macours |
| 9,959,744 B2 | 5/2018 | Koskan et al. |
| 9,965,092 B2 | 5/2018 | Smith |
| 10,032,550 B1 | 7/2018 | Zhang et al. |
| 10,039,080 B2 | 7/2018 | Miller et al. |
| 10,055,950 B2 | 8/2018 | Saboune et al. |
| 10,074,246 B2 | 9/2018 | Da Costa et al. |
| 10,082,873 B2 | 9/2018 | Zhang |
| 10,102,722 B2 | 10/2018 | Levesque et al. |
| 10,110,152 B1 | 10/2018 | Hajati |
| 10,165,358 B2 | 12/2018 | Koudar et al. |
| 10,171,008 B2 | 1/2019 | Nishitani et al. |
| 10,175,763 B2 | 1/2019 | Shah |
| 10,191,579 B2 | 1/2019 | Forlines et al. |
| 10,264,348 B1 | 4/2019 | Harris et al. |
| 10,402,031 B2 | 9/2019 | Vandermeijden et al. |
| 10,447,217 B2 | 10/2019 | Zhao et al. |
| 10,452,144 B2 | 10/2019 | Aimone et al. |
| 10,564,727 B2 | 2/2020 | Billington et al. |
| 10,620,704 B2 | 4/2020 | Rand et al. |
| 10,667,051 B2 | 5/2020 | Stahl |
| 10,726,638 B2 | 7/2020 | Mondello et al. |
| 10,732,714 B2 | 8/2020 | Rao et al. |
| 10,735,956 B2 | 8/2020 | Bae et al. |
| 10,782,785 B2 | 9/2020 | Hu et al. |
| 10,795,443 B2 | 10/2020 | Hu et al. |
| 10,820,100 B2 | 10/2020 | Stahl et al. |
| 10,828,672 B2 | 11/2020 | Stahl et al. |
| 10,832,537 B2 | 11/2020 | Doy et al. |
| 10,848,886 B2 | 11/2020 | Rand |
| 10,860,202 B2 | 12/2020 | Sepehr et al. |
| 10,955,955 B2 | 3/2021 | Peso Parada et al. |
| 10,969,871 B2 | 4/2021 | Rand et al. |
| 10,976,825 B2 | 4/2021 | Das et al. |
| 11,069,206 B2 | 7/2021 | Rao et al. |
| 11,079,874 B2 | 8/2021 | Lapointe et al. |
| 11,139,767 B2 | 10/2021 | Janko et al. |
| 11,150,733 B2 | 10/2021 | Das et al. |
| 11,259,121 B2 | 2/2022 | Lindemann |
| 11,460,526 B1 | 10/2022 | Foo et al. |
| 2001/0043714 A1 | 11/2001 | Asada et al. |
| 2002/0018578 A1 | 2/2002 | Burton |
| 2002/0044046 A1 | 4/2002 | Takahashi |
| 2002/0085647 A1 | 7/2002 | Oishi et al. |
| 2003/0068053 A1 | 4/2003 | Chu |
| 2003/0214485 A1 | 11/2003 | Roberts |
| 2004/0120540 A1 | 6/2004 | Mullenborn et al. |
| 2005/0031140 A1 | 2/2005 | Browning |
| 2005/0134562 A1 | 6/2005 | Grant et al. |
| 2005/0195919 A1 | 9/2005 | Cova |
| 2006/0028095 A1 | 2/2006 | Maruyama et al. |
| 2006/0197753 A1 | 9/2006 | Hotelling |
| 2006/0284856 A1 | 12/2006 | Soss |
| 2007/0013337 A1 | 1/2007 | Liu et al. |
| 2007/0024254 A1 | 2/2007 | Radecker et al. |
| 2007/0241816 A1 | 10/2007 | Okazaki et al. |
| 2008/0077367 A1 | 3/2008 | Odajima |
| 2008/0167832 A1 | 7/2008 | Soss |
| 2008/0226109 A1 | 9/2008 | Yamakata et al. |
| 2008/0240458 A1 | 10/2008 | Goldstein et al. |
| 2008/0293453 A1 | 11/2008 | Atlas et al. |
| 2008/0316181 A1 | 12/2008 | Nurmi |
| 2009/0020343 A1 | 1/2009 | Rothkopf et al. |
| 2009/0079690 A1 | 3/2009 | Watson et al. |
| 2009/0088220 A1 | 4/2009 | Persson |
| 2009/0096632 A1 | 4/2009 | Ullrich et al. |
| 2009/0102805 A1 | 4/2009 | Meijer et al. |
| 2009/0128306 A1 | 5/2009 | Luden et al. |
| 2009/0153499 A1 | 6/2009 | Kim et al. |
| 2009/0189867 A1 | 7/2009 | Krah et al. |
| 2009/0278819 A1 | 11/2009 | Goldenberg et al. |
| 2009/0313542 A1 | 12/2009 | Cruz-Hernandez et al. |
| 2010/0013761 A1 | 1/2010 | Birnbaum et al. |
| 2010/0080331 A1 | 4/2010 | Garudadri et al. |
| 2010/0085317 A1 | 4/2010 | Park et al. |
| 2010/0141408 A1 | 6/2010 | Doy et al. |
| 2010/0141606 A1 | 6/2010 | Bae et al. |
| 2010/0260371 A1 | 10/2010 | Afshar |
| 2010/0261526 A1 | 10/2010 | Anderson et al. |
| 2010/0331685 A1 | 12/2010 | Stein et al. |
| 2011/0056763 A1 | 3/2011 | Tanase et al. |
| 2011/0075835 A1 | 3/2011 | Hill |
| 2011/0077055 A1 | 3/2011 | Pakula et al. |
| 2011/0141052 A1 | 6/2011 | Bernstein et al. |
| 2011/0161537 A1 | 6/2011 | Chang |
| 2011/0163985 A1 | 7/2011 | Bae et al. |
| 2011/0167391 A1 | 7/2011 | Momeyer et al. |
| 2012/0011436 A1 | 1/2012 | Jinkinson et al. |

(56) References Cited

U.S. PATENT DOCUMENTS

| | | |
|---|---|---|
| 2012/0105358 A1 | 5/2012 | Momeyer et al. |
| 2012/0105367 A1 | 5/2012 | Son et al. |
| 2012/0112894 A1 | 5/2012 | Yang et al. |
| 2012/0206246 A1 | 8/2012 | Cruz-Hernandez et al. |
| 2012/0206247 A1 | 8/2012 | Bhatia et al. |
| 2012/0229264 A1 | 9/2012 | Company Bosch et al. |
| 2012/0249462 A1 | 10/2012 | Flanagan et al. |
| 2012/0253698 A1 | 10/2012 | Cokonaj |
| 2012/0306631 A1 | 12/2012 | Hughes |
| 2013/0016855 A1 | 1/2013 | Lee et al. |
| 2013/0027359 A1 | 1/2013 | Schevin et al. |
| 2013/0038792 A1 | 2/2013 | Quigley et al. |
| 2013/0096849 A1 | 4/2013 | Campbell et al. |
| 2013/0141382 A1 | 6/2013 | Simmons et al. |
| 2013/0208923 A1 | 8/2013 | Suvanto |
| 2013/0275058 A1 | 10/2013 | Awad |
| 2013/0289994 A1 | 10/2013 | Newman et al. |
| 2013/0307786 A1 | 11/2013 | Heubel |
| 2014/0035736 A1 | 2/2014 | Weddle et al. |
| 2014/0056461 A1 | 2/2014 | Afshar |
| 2014/0064516 A1 | 3/2014 | Cruz-Hernandez et al. |
| 2014/0079248 A1 | 3/2014 | Short et al. |
| 2014/0085064 A1* | 3/2014 | Crawley .......... G08B 6/00 340/407.1 |
| 2014/0118125 A1 | 5/2014 | Bhatia |
| 2014/0118126 A1 | 5/2014 | Garg et al. |
| 2014/0119244 A1 | 5/2014 | Steer et al. |
| 2014/0125467 A1 | 5/2014 | Da Costa et al. |
| 2014/0139327 A1 | 5/2014 | Bau et al. |
| 2014/0176415 A1 | 6/2014 | Buuck et al. |
| 2014/0205260 A1 | 7/2014 | Lacroix et al. |
| 2014/0222377 A1 | 8/2014 | Bitan et al. |
| 2014/0226068 A1 | 8/2014 | Lacroix et al. |
| 2014/0253303 A1 | 9/2014 | Levesque |
| 2014/0292501 A1 | 10/2014 | Lim et al. |
| 2014/0300454 A1 | 10/2014 | Lacroix et al. |
| 2014/0340209 A1 | 11/2014 | Lacroix et al. |
| 2014/0347176 A1 | 11/2014 | Modarres et al. |
| 2015/0010176 A1 | 1/2015 | Scheveiw et al. |
| 2015/0201294 A1 | 1/2015 | Risberg et al. |
| 2015/0036831 A1* | 2/2015 | Klippel .......... H04R 11/00 381/55 |
| 2015/0049882 A1 | 2/2015 | Chiu et al. |
| 2015/0061846 A1 | 3/2015 | Yliaho |
| 2015/0070149 A1 | 3/2015 | Cruz-Hernandez et al. |
| 2015/0070151 A1 | 3/2015 | Cruz-Hernandez et al. |
| 2015/0070154 A1 | 3/2015 | Levesque et al. |
| 2015/0070260 A1 | 3/2015 | Saboune et al. |
| 2015/0077324 A1 | 3/2015 | Birnbaum et al. |
| 2015/0084752 A1 | 3/2015 | Heubel et al. |
| 2015/0116205 A1 | 4/2015 | Westerman et al. |
| 2015/0130767 A1 | 5/2015 | Myers et al. |
| 2015/0154966 A1 | 6/2015 | Bharitkar et al. |
| 2015/0208189 A1 | 7/2015 | Tsai |
| 2015/0216762 A1 | 8/2015 | Oohashi et al. |
| 2015/0234464 A1 | 8/2015 | Yliaho |
| 2015/0249888 A1 | 9/2015 | Bogdanov |
| 2015/0264455 A1 | 9/2015 | Granoto et al. |
| 2015/0268768 A1 | 9/2015 | Woodhull et al. |
| 2015/0324116 A1 | 11/2015 | Marsden et al. |
| 2015/0325116 A1 | 11/2015 | Umminger, III |
| 2015/0339898 A1 | 11/2015 | Saboune et al. |
| 2015/0341714 A1 | 11/2015 | Ahn et al. |
| 2015/0355259 A1 | 12/2015 | Sartler et al. |
| 2015/0356981 A1 | 12/2015 | Johnson et al. |
| 2016/0004311 A1 | 1/2016 | Yliaho |
| 2016/0007095 A1 | 1/2016 | Lacroix |
| 2016/0063826 A1 | 3/2016 | Morrell et al. |
| 2016/0070353 A1 | 3/2016 | Lacroix et al. |
| 2016/0070392 A1 | 3/2016 | Wang et al. |
| 2016/0074278 A1 | 3/2016 | Muench et al. |
| 2016/0097662 A1 | 4/2016 | Chang et al. |
| 2016/0132118 A1 | 5/2016 | Park et al. |
| 2016/0155305 A1 | 6/2016 | Barsilai et al. |
| 2016/0162031 A1 | 6/2016 | Westerman et al. |
| 2016/0179203 A1 | 6/2016 | Modarres et al. |
| 2016/0187987 A1 | 6/2016 | Ullrich et al. |
| 2016/0195930 A1 | 7/2016 | Venkatesan et al. |
| 2016/0227614 A1 | 8/2016 | Lissoni et al. |
| 2016/0239089 A1 | 8/2016 | Taninaka et al. |
| 2016/0246378 A1 | 8/2016 | Sampanes et al. |
| 2016/0277821 A1 | 9/2016 | Kunimoto |
| 2016/0291731 A1 | 10/2016 | Liu et al. |
| 2016/0328065 A1 | 11/2016 | Johnson et al. |
| 2016/0358605 A1 | 12/2016 | Ganong, III et al. |
| 2017/0052593 A1 | 2/2017 | Jiang et al. |
| 2017/0078804 A1 | 3/2017 | Guo et al. |
| 2017/0083096 A1 | 3/2017 | Rihn et al. |
| 2017/0090572 A1 | 3/2017 | Holenarsipur et al. |
| 2017/0090573 A1 | 3/2017 | Hajati et al. |
| 2017/0131131 A1 | 5/2017 | Keech |
| 2017/0153760 A1 | 6/2017 | Chawda et al. |
| 2017/0168574 A1 | 6/2017 | Zhang |
| 2017/0168773 A1 | 6/2017 | Keller et al. |
| 2017/0169674 A1 | 6/2017 | Macours |
| 2017/0180863 A1 | 6/2017 | Biggs et al. |
| 2017/0220197 A1 | 8/2017 | Matsumoto et al. |
| 2017/0256145 A1 | 9/2017 | Macours et al. |
| 2017/0277350 A1 | 9/2017 | Wang et al. |
| 2017/0277360 A1 | 9/2017 | Breedvelt-Schouten et al. |
| 2017/0031495 A1 | 12/2017 | Tse |
| 2017/0357440 A1 | 12/2017 | Tse |
| 2018/0021811 A1 | 1/2018 | Kutej et al. |
| 2018/0033946 A1 | 2/2018 | Kemppinen et al. |
| 2018/0059733 A1 | 3/2018 | Gault et al. |
| 2018/0059793 A1 | 3/2018 | Hajati |
| 2018/0067557 A1 | 3/2018 | Robert et al. |
| 2018/0074637 A1 | 3/2018 | Rosenberg et al. |
| 2018/0082673 A1 | 3/2018 | Tzanetos |
| 2018/0084362 A1 | 3/2018 | Zhang et al. |
| 2018/0095596 A1 | 4/2018 | Turgeman |
| 2018/0139538 A1 | 5/2018 | Macours |
| 2018/0151036 A1 | 5/2018 | Cha et al. |
| 2018/0158289 A1 | 6/2018 | Vasilev et al. |
| 2018/0159452 A1 | 6/2018 | Eke et al. |
| 2018/0159457 A1* | 6/2018 | Eke .......... H02P 7/04 |
| 2018/0159545 A1 | 6/2018 | Eke et al. |
| 2018/0160227 A1 | 6/2018 | Lawrence et al. |
| 2018/0165925 A1 | 6/2018 | Israr et al. |
| 2018/0178114 A1 | 6/2018 | Mizuta et al. |
| 2018/0182212 A1 | 6/2018 | Li et al. |
| 2018/0183372 A1 | 6/2018 | Li et al. |
| 2018/0194369 A1 | 7/2018 | Lisseman et al. |
| 2018/0196567 A1 | 7/2018 | Klein et al. |
| 2018/0224963 A1 | 8/2018 | Lee et al. |
| 2018/0227063 A1 | 8/2018 | Heubel et al. |
| 2018/0237033 A1 | 8/2018 | Hakeem et al. |
| 2018/0206282 A1 | 9/2018 | Singh |
| 2018/0253123 A1 | 9/2018 | Levesque et al. |
| 2018/0255411 A1 | 9/2018 | Lin et al. |
| 2018/0267897 A1 | 9/2018 | Jeong |
| 2018/0294757 A1 | 10/2018 | Feng et al. |
| 2018/0301060 A1 | 10/2018 | Israr et al. |
| 2018/0304310 A1 | 10/2018 | Long et al. |
| 2018/0321056 A1 | 11/2018 | Yoo et al. |
| 2018/0321748 A1 | 11/2018 | Rao et al. |
| 2018/0323725 A1 | 11/2018 | Cox et al. |
| 2018/0329172 A1 | 11/2018 | Tabuchi |
| 2018/0335848 A1 | 11/2018 | Moussette et al. |
| 2018/0367897 A1 | 12/2018 | Bjork et al. |
| 2019/0020760 A1 | 1/2019 | DeBates et al. |
| 2019/0033348 A1 | 1/2019 | Zeleznik et al. |
| 2019/0035235 A1 | 1/2019 | Da Costa et al. |
| 2019/0227628 A1 | 1/2019 | Rand et al. |
| 2019/0044651 A1 | 2/2019 | Nakada |
| 2019/0049499 A1 | 2/2019 | Eissner |
| 2019/0051229 A1 | 2/2019 | Ozguner et al. |
| 2019/0064925 A1 | 2/2019 | Kim et al. |
| 2019/0069088 A1 | 2/2019 | Seiler |
| 2019/0073078 A1 | 3/2019 | Sheng et al. |
| 2019/0102031 A1 | 4/2019 | Shutzberg et al. |
| 2019/0103829 A1 | 4/2019 | Vasudevan et al. |
| 2019/0138098 A1 | 5/2019 | Shah |
| 2019/0163234 A1 | 5/2019 | Kim et al. |

(56) References Cited

U.S. PATENT DOCUMENTS

| | | |
|---|---|---|
| 2019/0196596 A1 | 6/2019 | Yokoyama et al. |
| 2019/0206396 A1 | 7/2019 | Chen |
| 2019/0215349 A1 | 7/2019 | Adams et al. |
| 2019/0220095 A1 | 7/2019 | Ogita et al. |
| 2019/0228619 A1 | 7/2019 | Yokoyama et al. |
| 2019/0114496 A1 | 8/2019 | Lesso |
| 2019/0235629 A1 | 8/2019 | Hu et al. |
| 2019/0294247 A1 | 9/2019 | Hu et al. |
| 2019/0295755 A1 | 9/2019 | Konradi et al. |
| 2019/0296674 A1 | 9/2019 | Janko et al. |
| 2019/0297418 A1 | 9/2019 | Stahl |
| 2019/0305851 A1 | 10/2019 | Vegas-Olmos et al. |
| 2019/0311590 A1 | 10/2019 | Doy et al. |
| 2019/0341903 A1 | 11/2019 | Kim |
| 2019/0384393 A1 | 12/2019 | Cruz-Hernandez et al. |
| 2019/0384898 A1 | 12/2019 | Chen et al. |
| 2020/0117506 A1 | 4/2020 | Chan |
| 2020/0139403 A1 | 5/2020 | Palit |
| 2020/0150767 A1 | 5/2020 | Karimi Eskandary et al. |
| 2020/0218352 A1 | 7/2020 | Macours et al. |
| 2020/0231085 A1 | 7/2020 | Kunii et al. |
| 2020/0313529 A1 | 10/2020 | Lindemann et al. |
| 2020/0313654 A1 | 10/2020 | Marchais et al. |
| 2020/0314969 A1 | 10/2020 | Marchais et al. |
| 2020/0395908 A1 | 12/2020 | Schindler et al. |
| 2020/0401292 A1 | 12/2020 | Lorenz et al. |
| 2020/0403546 A1* | 12/2020 | Janko ..................... G06F 3/016 |
| 2021/0108975 A1 | 4/2021 | Parada et al. |
| 2021/0125469 A1 | 4/2021 | Alderson |
| 2021/0153562 A1 | 5/2021 | Fishwick et al. |
| 2021/0157436 A1 | 5/2021 | Peso Parada et al. |
| 2021/0174777 A1 | 6/2021 | Marchais et al. |
| 2021/0175869 A1 | 6/2021 | Taipale |
| 2021/0200316 A1 | 7/2021 | Das et al. |
| 2021/0325967 A1 | 10/2021 | Khenkin et al. |
| 2021/0328535 A1 | 10/2021 | Khenkin et al. |
| 2021/0360347 A1 | 11/2021 | Aschieri |
| 2021/0365118 A1 | 11/2021 | Rajapurkar et al. |
| 2022/0026989 A1 | 1/2022 | Rao et al. |

FOREIGN PATENT DOCUMENTS

| | | |
|---|---|---|
| CN | 103403796 A | 11/2013 |
| CN | 104811838 A | 7/2015 |
| CN | 204903757 U | 12/2015 |
| CN | 105264551 A | 1/2016 |
| CN | 106438890 A | 2/2017 |
| CN | 106950832 A | 7/2017 |
| CN | 107665051 A | 2/2018 |
| CN | 107835968 A | 3/2018 |
| CN | 210628147 U | 5/2020 |
| CN | 113268138 A | 8/2021 |
| CN | 114237414 A | 3/2022 |
| EP | 0784844 B1 | 6/2005 |
| EP | 2306269 A | 4/2011 |
| EP | 2363785 A1 | 9/2011 |
| EP | 2487780 A1 | 8/2012 |
| EP | 2600225 A1 | 6/2013 |
| EP | 2846218 A1 | 3/2015 |
| EP | 2846229 A2 | 3/2015 |
| EP | 2846329 A1 | 3/2015 |
| EP | 2988528 A1 | 2/2016 |
| EP | 3125508 A1 | 2/2017 |
| EP | 3379382 A1 | 9/2018 |
| EP | 3546035 A1 | 10/2019 |
| EP | 3937379 A1 | 1/2022 |
| GB | 201620746 A | 1/2017 |
| IN | 201747044027 | 8/2018 |
| JP | 102130433 B2 | 5/1990 |
| JP | H08149006 A | 6/1996 |
| JP | 10184782 A * | 7/1998 |
| JP | H10184782 A | 7/1998 |
| JP | 6026751 B2 | 11/2016 |
| JP | 6250985 | 12/2017 |
| JP | 6321351 | 5/2018 |
| KR | 20120126446 A | 11/2012 |
| WO | 2013104919 A1 | 7/2013 |
| WO | 2013186845 A1 | 12/2013 |
| WO | 2014018086 A1 | 1/2014 |
| WO | 2014094283 A1 | 6/2014 |
| WO | 2016105496 A1 | 6/2016 |
| WO | 2016164193 A1 | 10/2016 |
| WO | 2017034973 A1 | 3/2017 |
| WO | 2017113651 A1 | 7/2017 |
| WO | 2017113652 A1 | 7/2017 |
| WO | 2018053159 A1 | 3/2018 |
| WO | 2018067613 A1 | 4/2018 |
| WO | 2018125347 A1 | 7/2018 |
| WO | 2020004840 A1 | 1/2020 |
| WO | 2020055405 A1 | 3/2020 |

OTHER PUBLICATIONS

International Search Report and Written Opinion of the International Searching Authority, International Application No. PCT/GB2020/050822, mailed Aug. 31, 2020.

International Search Report and Written Opinion of the International Searching Authority, International Application No. PCT/GB2020/051438, mailed Sep. 28, 2020.

First Examination Opinion Notice, State Intellectual Property Office of the People's Republic of China, Application No. 201880037435.X, issued Dec. 31, 2020.

International Search Report and Written Opinion of the International Searching Authority, International Application No. PCT/GB2019/050964, mailed Sep. 3, 2019.

International Search Report and Written Opinion of the International Searching Authority, International Application No. PCT/GB2019/050770, mailed Jul. 5, 2019.

Communication Relating to the Results of the Partial International Search, and Provisional Opinion Accompanying the Partial Search Result, of the International Searching Authority, International Application No. PCT/US2018/031329, mailed Jul. 20, 2018.

Combined Search and Examination Report, UKIPO, Application No. GB1720424.9, mailed Jun. 5, 2018.

Invitation to Pay Additional Fees, Partial International Search Report and Provisional Opinion of the International Searching Authority, International Application No. PCT/US2020/052537, mailed Jan. 14, 2021.

International Search Report and Written Opinion of the International Searching Authority, International Application No. PCT/US2020/056610, mailed Jan. 21, 2021.

International Search Report and Written Opinion of the International Searching Authority, International Application No. PCT/GB2020/052537, mailed Mar. 9, 2021.

Office Action of the Intellectual Property Office, ROC (Taiwan) Patent Application No. 107115475, issued Apr. 30, 2021.

First Office Action, China National Intellectual Property Administration, Patent Application No. 2019800208570, issued Jun. 3, 2021.

International Search Report and Written Opinion of the International Searching Authority, International Application No. PCT/US2021/021908, mailed Jun. 9, 2021.

Notice of Preliminary Rejection, Korean Intellectual Property Office, Application No. 10-2019-7036236, mailed Jun. 29, 2021.

Combined Search and Examination Report, United Kingdom Intellectual Property Office, Application No. GB2018051.9, mailed Jun. 30, 2021.

Communication pursuant to Rule 164(2)(b) and Article 94(3) EPC, European Patent Office, Application No. 18727512.8, mailed Jul. 8, 2021.

Gottfried Behler: "Measuring the Loudspeaker's Impedance during Operation for the Derivation of the Voice Coil Temperature", AES Convention Preprint, Feb. 25, 1995 (Feb. 25, 1995), Paris.

First Office Action, China National Intellectual Property Administration, Patent Application No. 2019800211287, issued Jul. 5, 2021.

International Search Report and Written Opinion of the International Searching Authority, International Application No. PCT/GB2019/052991, dated Mar. 17, 2020.

(56) References Cited

OTHER PUBLICATIONS

International Search Report and Written Opinion of the International Searching Authority, International Application No. PCT/GB2020/050823, mailed Jun. 30, 2020.
International Search Report and Written Opinion of the International Searching Authority, International Application No. PCT/GB2020/051037, mailed Jul. 9, 2020.
Communication Relating to the Results of the Partial International Search, and Provisional Opinion Accompanying the Partial Search Result, of the International Searching Authority, International Application No. PCT/GB2020/050822, mailed Jul. 9, 2020.
International Search Report and Written Opinion of the International Searching Authority, International Application No. PCT/GB2020/051035, mailed Jul. 10, 2020.
Steinbach et al., Haptic Data Compression and Communication, IEEE Signal Processing Magazine, Jan. 2011.
Pezent et al., Syntacts Open-Source Software and Hardware for Audio-Controlled Haptics, IEEE Transactions on Haptics, vol. 14, No. 1, Jan.-Mar. 2021.
Danieau et al., Enhancing Audiovisual Experience with Haptic Feedback: A Survey on HAV, IEEE Transactions on Haptics, vol. 6, No. 2, Apr.-Jun. 2013.
Danieau et al., Toward Haptic Cinematography: Enhancing Movie Experiences with Camera-Based Haptic Effects, IEEE Computer Society, IEEE MultiMedia, Apr.-Jun. 2014.
Jaijongrak et al., A Haptic and Auditory Assistive User Interface: Helping the Blinds on their Computer Operations, 2011 IEEE International Conference on Rehabilitation Robotics, Rehab Week Zurich, ETH Zurich Science City, Switzerland, Jun. 29-Jul. 1, 2011.
Lim et al., An Audio-Haptic Feedbacks for Enhancing User Experience in Mobile Devices, 2013 IEEE International Conference on Consumer Electronics (ICCE).
Weddle et al., How Does Audio-Haptic Enhancement Influence Emotional Response to Mobile Media, 2013 Fifth International Workshop on Quality of Multimedia Experience (QoMEX), QMEX 2013.
Final Notice of Preliminary Rejection, Korean Patent Office, Application No. 10-2019-7036236, mailed Nov. 29, 2021.
Examination Report, United Kingdom Intellectual Property Office, Application No. GB2018051.9, mailed Nov. 5, 2021.
Examination Report under Section 18(3), United Kingdom Intellectual Property Office, Application No. GB2018050.1, mailed Dec. 22, 2021.
Second Office Action, National Intellectual Property Administration, PRC, Application No. 2019800208570, issued Jan. 19, 2022.
Examination Report under Section 18(3), United Kingdom Intellectual Property Office, Application No. GB2106247.6, mailed Mar. 31, 2022.
Combined Search and Examination Report under Sections 17 and 18(3), UKIPO, Application No. GB2210174.5, mailed Aug. 1, 2022.
Examination Report under Sections 17 and 18(3), UKIPO, Application No. GB2112207.2, mailed Aug. 18, 2022.
Examination Report under Section 18(3), UKIPO, Application No. GB2115048.7, mailed Aug. 24, 2022.
International Search Report and Written Opinion of the International Searching Authority, International Application No. PCT/US2022/030541, mailed Sep. 1, 2022.
Vanderborght, B. et al., Variable impedance actuators: A review; Robotics and Autonomous Systems 61, Aug. 6, 2013, pp. 1601-1614.
International Search Report and Written Opinion of the International Searching Authority, International Application No. PCT/US2022/033190, mailed Sep. 8, 2022.
International Search Report and Written Opinion of the International Searching Authority, International Application No. PCT/US2022/033230, mailed Sep. 15, 2022.
Communication pursuant to Article 94(3), EPC, European Patent Office, Application No. 18727512.8, mailed Sep. 26, 2022.
Examination Report under Section 18(3), UKIPO, Application No. GB2112207.2, mailed Nov. 7, 2022.
Examination Report, Intellectual Property India, Application No. 202117019138, mailed Jan. 4, 2023.
Examination Report under Section 18(3), UKIPO, Application No. GB2113228.7, mailed Feb. 10, 2023.
Examination Report under Section 18(3), UKIPO, Application No. GB2113154.5, mailed Feb. 17, 2023.
Search Report, China National Intellectual Property Administration, Application No. 2019107179621, dated Jan. 11, 2023.
First Office Action, China National Intellectual Property Administration, Application No. 2019107179621, mailed Jan. 19, 2023.
Second Office Action, National Intellectual Property Administration, PRC, Application No. 2019107179621, issued May 24, 2023.
Examination Report under Section 18(3), UKIPO, Application No. GB2113228.7, mailed Jun. 28, 2023.
Combined Search and Examination Report under Sections 17 and 18(3), UKIPO, Application No. GB2204956.3, mailed Jul. 24, 2023.
Notice of Preliminary Rejection, Korean Intellectual Property Office, Application No. 10-2023-7029306, mailed Sep. 19, 2023.
Examination Report under Section 17, UKIPO, Application No. GB2311104.0 mailed Sep. 4, 2023.
Examination Report under Section 17, UKIPO, Application No. GB2311103.2 mailed Sep. 11, 2023.

\* cited by examiner

FIG. 5

RESTRICTING UNDESIRED MOVEMENT OF A HAPTIC ACTUATOR

FIELD OF DISCLOSURE

The present disclosure relates in general to minimizing undesired movement of a haptic actuator.

BACKGROUND

Vibro-haptic transducers, for example linear resonant actuators (LRAs), are widely used in portable devices such as mobile phones to generate vibrational feedback to a user. Vibro-haptic feedback in various forms creates different feelings of touch to a user's skin, and may play increasing roles in human-machine interactions for modern devices.

An LRA may be modelled as a mass-spring electro-mechanical vibration system. When driven with appropriately designed or controlled driving signals, an LRA may generate certain desired forms of vibrations. For example, a sharp and clear-cut vibration pattern on a user's finger may be used to create a sensation that mimics a mechanical button click. This clear-cut vibration may then be used as a virtual switch to replace mechanical buttons.

Figure 1:
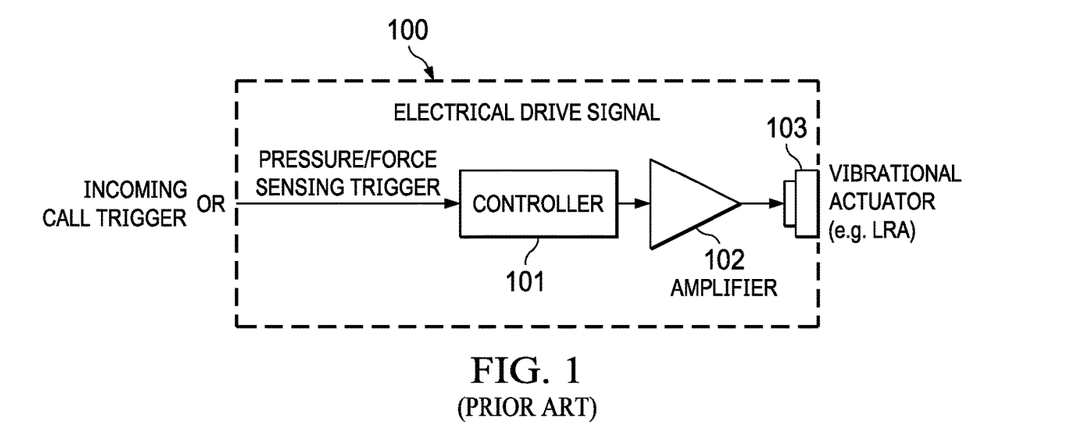
FIG. 1 illustrates an example of a vibro-haptic system in a device, as is known in the art.

FIG. 1 illustrates an example of a vibro-haptic system in a device 100. Device 100 may comprise a controller 101 configured to control a signal applied to an amplifier 102. Amplifier 102 may then drive a vibrational actuator (e.g., haptic transducer) 103 based on the signal. Controller 101 may be triggered by a trigger to output to the signal. The trigger may for example comprise a pressure or force sensor on a screen or virtual button of device 100.

Among the various forms of vibro-haptic feedback, tonal vibrations of sustained duration may play an important role to notify the user of the device of certain predefined events, such as incoming calls or messages, emergency alerts, and timer warnings, etc. In order to generate tonal vibration notifications efficiently, it may be desirable to operate the haptic actuator at its resonance frequency.

The resonance frequency $f_0$ of a haptic transducer may be approximately estimated as:

$$f_0 = \frac{1}{2\pi\sqrt{CM}} \quad (1)$$

where C is the compliance of the spring system, and M is the equivalent moving mass, which may be determined based on both the actual moving part in the haptic transducer and the mass of the portable device holding the haptic transducer.

Due to sample-to-sample variations in individual haptic transducers, mobile device assembly variations, temporal component changes caused by aging, and use conditions such as various different strengths of a user gripping of the device, the vibration resonance of the haptic transducer may vary from time to time.

Figure 2:
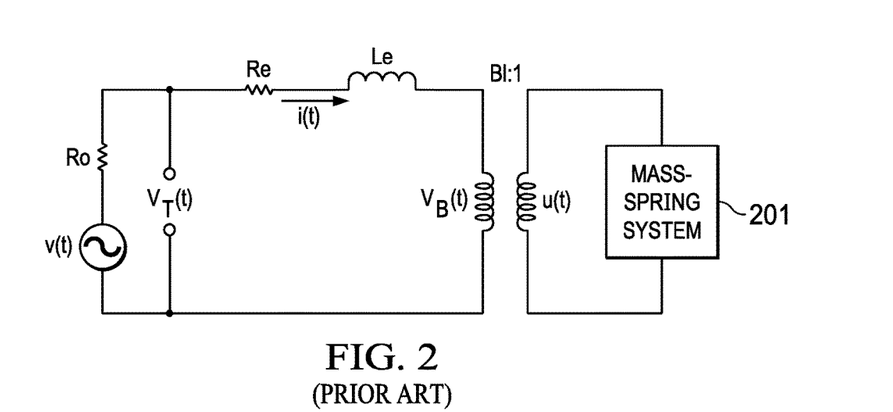
FIG. 2 illustrates an example of a Linear Resonant Actuator (LRA) modelled as a linear system, as is known in the art.

FIG. 2 illustrates an example of a linear resonant actuator (LRA) modelled as a linear system. LRAs are non-linear components that may behave differently depending on, for example, the voltage levels applied, the operating temperature, and the frequency of operation. However, these components may be modelled as linear components within certain conditions. In this example, the LRA is modelled as a third order system having electrical and mechanical elements. In particular, Re and Le are the DC resistance and coil inductance of the coil-magnet system, respectively; and Bl is the magnetic force factor of the coil. The driving amplifier outputs the voltage waveform V(t) with the output impedance Ro. The terminal voltage $V_T(t)$ may be sensed across the terminals of the haptic transducer. The mass-spring system 201 moves with velocity u(t).

Because haptic transducers are used in mobile, portable, and wearable devices (e.g., smart phones, smart watches, etc.), haptic transducers are often subject to rapid movements. In some embodiments, such rapid movements may cause sufficient mass displacement of a haptic transducer for the displacement to be perceived by a user. Such unexpected tactile stimulus may be undesirable as it may be confused with an actual haptic event (e.g., a user notification) and/or may annoy the user.

SUMMARY

In accordance with the teachings of the present disclosure, the disadvantages and problems associated with existing approaches for minimizing undesired movements of a haptic transducer may be reduced or eliminated.

In accordance with embodiments of the present disclosure, a method for minimizing undesired movement of a moving mass of an electromagnetic load may include detecting undesired movement of the moving mass based on real-time measurements of one or more parameters associated with the electromagnetic load and, responsive to detecting undesired movement of the moving mass, affecting a signal applied to the moving mass to reduce the undesired movement.

In accordance with embodiments of the present disclosure, a system for minimizing undesired movement of a moving mass of an electromagnetic load may include one or more inputs for receiving real time measurements of one or more parameters associated with the electromagnetic load and a processing subsystem configured to detect undesired movement of the moving mass based on real-time measurements of one or more parameters associated with the electromagnetic load and, responsive to detecting undesired movement of the moving mass, affect a signal applied to the moving mass to reduce the undesired movement.

In accordance with embodiments of the present disclosure, a host device may include an electromagnetic load, one or more inputs for receiving real time measurements of one or more parameters associated with the electromagnetic load, and a processing subsystem configured to detect undesired movement of the moving mass based on real-time measurements of one or more parameters associated with the electromagnetic load and, responsive to detecting undesired movement of the moving mass, affect a signal applied to the moving mass to reduce the undesired movement.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively, an electronic device may have a connector, e.g., a socket, for making a removable mating connection with a corresponding connector of an accessory apparatus, and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal may generally be an analog time-varying voltage signal, for example, a time-varying waveform.

Figure 3:
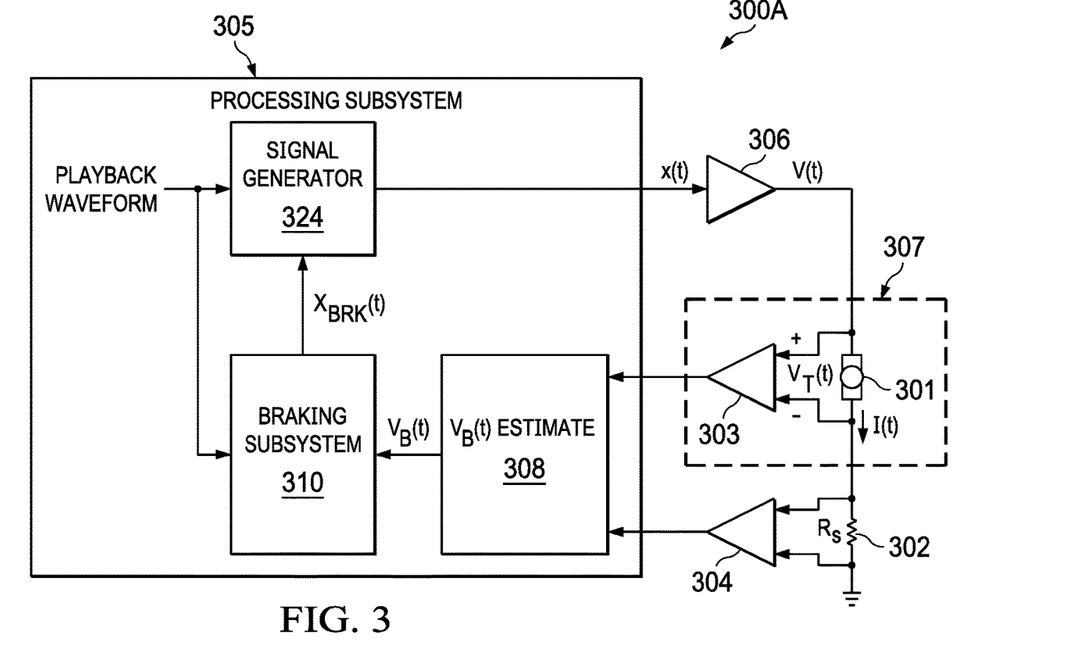
FIG. 3 illustrates selected components of an example host device incorporating force sensing using an electromagnetic load of the host device, in accordance with embodiments of the present disclosure.

FIG. 3 illustrates selected components of an example host device 300A incorporating force sensing using an electromagnetic load 301 of host device 300A, in accordance with embodiments of the present disclosure. Host device 300A may include, without limitation, a mobile device, home application, a vehicle, and/or any other system, device, or apparatus that includes a human-machine interface. Electromagnetic load 301 may include any suitable load with a complex impedance, including without limitation a haptic transducer, a loudspeaker, a microspeaker, a piezoelectric transducer, or other suitable transducer.

In operation, a signal generator 324 of a processing subsystem 305 of host device 300A may generate a signal x(t) (which, in some embodiments, may be a waveform signal, such as a haptic waveform signal or audio signal). Signal x(t) may be generated based on a desired playback waveform received by signal generator 324. Signal x(t) may in turn be amplified by amplifier 306 to generate the driving signal V(t) for driving electromagnetic load 301. Responsive to driving signal V(t), a sensed terminal voltage $V_T(t)$ of electromagnetic load 301 may be converted to a digital representation by a first analog-to-digital converter (ADC) 303. Similarly, sensed current I(t) may be converted to a digital representation by a second ADC 304. Current I(t) may be sensed across a shunt resistor 302 having resistance $R_s$ coupled to a terminal of electromagnetic load 301. The terminal voltage $V_T(t)$ may be sensed by a terminal voltage sensing block 307, for example a volt meter.

As shown in FIG. 3, processing subsystem 305 may include a back-EMF estimate block 308 that may estimate back-EMF voltage $V_B(t)$. In general, back EMF voltage $V_B(t)$ may not be directly measured from outside of the haptic transducer. However, the terminal voltage $V_T(t)$ measured at the terminals of the haptic transducer may be related to $V_B(t)$ by:

$$V_T(t) = V_B(r) + Re \cdot I(t) + Le\frac{dI(t)}{dt} \quad (2)$$

where the parameters are defined as described with reference to FIG. 2. Consequently, back-EMF voltage $V_B(t)$ may be estimated according to equation (2) which may be rearranged as:

$$V_B(t) = V_T(t) - Re \cdot I(t) - Le\frac{dI(t)}{dt} \quad (3)$$

Because back-EMF voltage $V_B(t)$ may be proportional to velocity of the moving mass of electromagnetic load 301, back-EMF voltage $V_B(t)$ may in turn provide an estimate of such velocity.

In some embodiments, back-EMF estimate block 308 may be implemented as a digital filter with a proportional and parallel difference path. The estimates of DC resistance Re and inductance Le may not need to be accurate (e.g., within an approximate 10% error may be acceptable), and thus, fixed values from an offline calibration or from a data sheet specification may be sufficient. As an example, in some embodiments, back-EMF estimate block 308 may determine estimated back-EMF voltage $V_B(t)$ in accordance with the teachings of U.S. patent application Ser. No. 16/559,238, filed Sep. 3, 2019 (the "'238 application"), which is incorporated by reference herein in its entirety.

Based on such estimated back-EMF voltage $V_B(t)$, a braking subsystem 310 of processing subsystem 305 may generate a braking signal $x_{BRK}(t)$, in order to minimize a post-playback settling time of electromagnetic load 301, as described in greater detail below. Signal generator 324 may receive braking signal $x_{BRK}(t)$ and sum it with a playback waveform to generate signal x(t) communicated to amplifier 306.

In general, braking subsystem 310 may, at the conclusion of a playback waveform, generate braking signal $x_{BRK}(t)$ as a piecewise square signal with an amplitude in each piece of the square given by:

$$A_{BRK} = -K_{BRK} \frac{dV_B(t)}{dt} \text{ when } V_B(t) = 0 \quad (4)$$

where $K_{BRK}$ is an arbitrary positive gain constant which may be determined for each model or type of electromagnetic load 301.

Thus, braking subsystem 310 may reverse polarity of the braking signal at the zero crossings of the velocity of the moving mass of electromagnetic load 301, which may be given by zero crossings of estimated back-EMF voltage $V_B(t)$. Further, braking subsystem 310 may, for each piece of braking signal $x_{BRK}(t)$, adaptively determine an amplitude of such piece based on the derivative with respect to time at the previous zero crossing of estimated back-EMF voltage $V_B(t)$. Accordingly, braking subsystem 310 may cause amplitude of braking signal $x_{BRK}(t)$ to be reduced as the moving mass of electromagnetic load 301 is decelerated, to prevent reacceleration in the opposite direction. The derivative with respect to time at the previous zero crossing of estimated back-EMF voltage $V_B(t)$ may provide an indication of the instantaneous oscillation amplitude of estimated back-EMF voltage $V_B(t)$, and thus may provide a magnitude scalar to adapt amplitude $A_{BRK}$ of braking signal $x_{BRK}(t)$.

Figure 4:
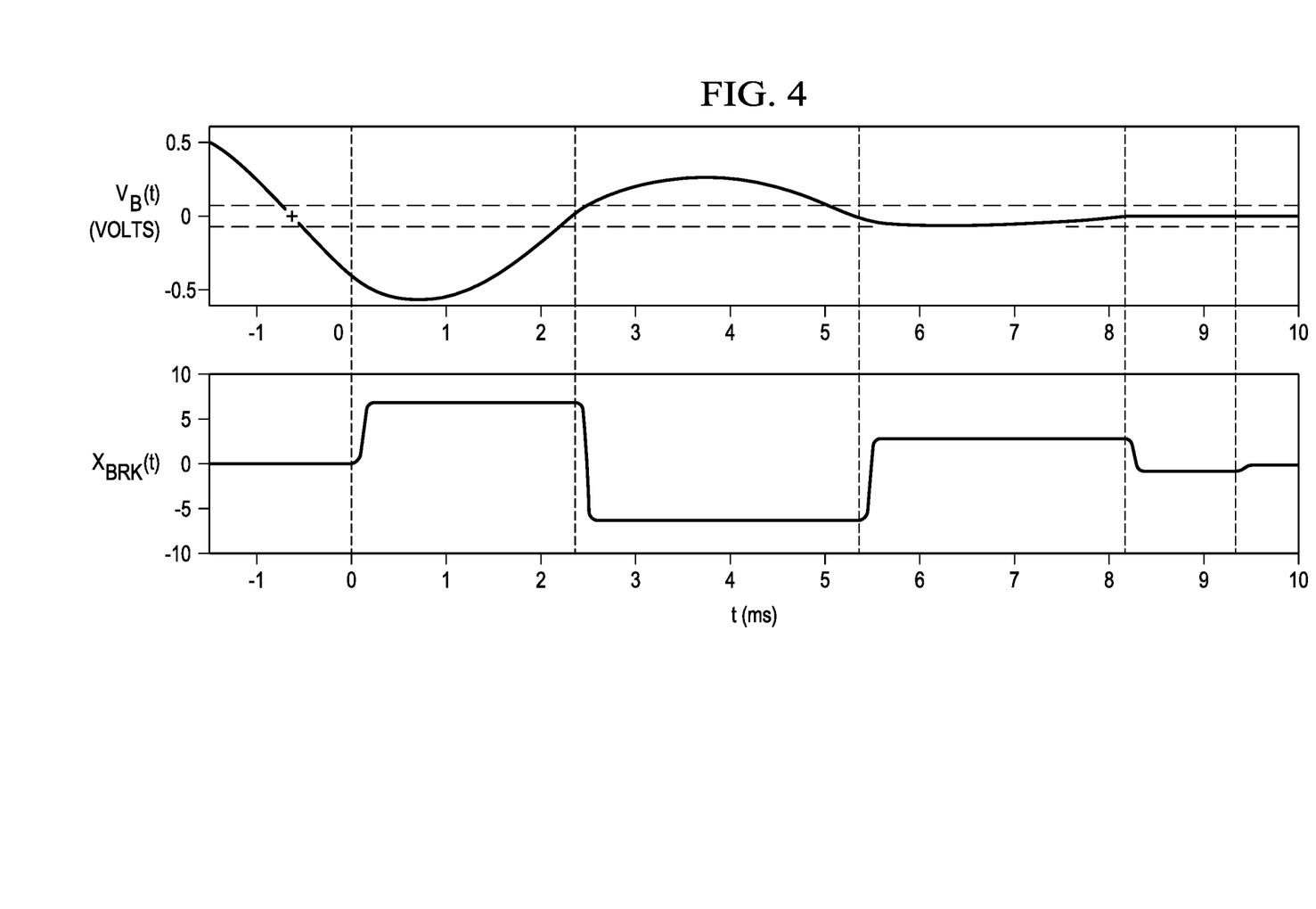
FIG. 4 illustrates a graph depicting an estimated transducer back electromotive force versus time and an active braking signal based on the estimated transducer back electromotive force versus time, in accordance with embodiments of the present disclosure.

FIG. 4 illustrates a graph depicting an estimated back-EMF voltage $V_B(t)$ and braking signal $x_{BRK}(t)$ generated based on estimated back-EMF voltage $V_B(t)$, in accordance with embodiments of the present disclosure. As is shown in FIG. 4, at a time t=0, corresponding to the end of a playback signal (and thus, the beginning of a braking phase) for electromagnetic load 301, braking subsystem 310 may begin generating braking signal $x_{BRK}(t)$ with a magnitude proportional to and opposite in polarity from the derivative with respect to time of estimated back-EMF voltage $V_B(t)$ at the previous zero crossing of estimated back-EMF voltage $V_B(t)$ in accordance with equation (4) above. At subsequent zero crossings of estimated back-EMF voltage $V_B(t)$, braking subsystem 310 may adaptively modify amplitude $A_{BRK}$ of braking signal $x_{BRK}(t)$ in accordance with equation (4) above, with such zero crossing serving to synchronize modification of amplitude $A_{BRK}$. Braking subsystem 310 may generate braking signal $x_{BRK}(t)$ and adapt its magnitude until such time as estimated back-EMF voltage $V_B(t)$, its derivative with respect to time at a zero crossing of estimated back-EMF voltage $V_B(t)$, or some other parameter indicates that electromagnetic load 301 has settled to an acceptable amount.

In some embodiments, braking subsystem 310 may simplify calculation and generation of braking signal $x_{BRK}(t)$ compared to that discussed above. For instance, if coil inductance Le of electromagnetic load 301 is very small compared to its DC resistance Re, equation (3) above may be approximated by:

$$V_B(t) = V_T(t) - Re \cdot I(t) \quad (5)$$

Use of such approximation for estimated back-EMF voltage $V_B(t)$ by braking subsystem 310 may simplify calculation or may reduce processing resource requirements by eliminating the need to calculate $$\frac{dI(t)}{dt}.$$

Furthermore, if DC resistance Re is not available, the polarity and derivative of estimated back-EMF voltage $V_B(t)$ may still be determined if $V_T(t)=0$, which further simplifies equation (4) above to:

$$V_B(t) \approx -Re \cdot I(t) \propto -I(t) \quad (6)$$

Under this approximation, estimated back-EMF voltage $V_B(t)$ is in phase with current I(t). When the moving mass of electromagnetic load 301 is at a no-rest state and driving signal V(t) is set to zero, the mass of electromagnetic load 301 may oscillate at its resonance frequency $f_0$ with an exponentially decaying amplitude. In this state, electromagnetic load 301 may also be considered at resonance, meaning that the residual motion of the mass in the LRA may elicit current I(t) which is in phase with the velocity of the oscillation of the mass. Thus, in such scenario, braking subsystem 310 may effectively minimize settling time by measuring current I(t) alone, determining a direction and magnitude of the velocity of the moving mass of electromagnetic load 301 based on measured current I(t), and generating braking signal $x_{BRK}(t)$ to oppose such motion indicated by measured current I(t).

Although the foregoing contemplates that measurement of estimated back-EMF voltage $V_B(t)$ and the application of braking signal $x_{BRK}(t)$ may occur at the same time, in some embodiments the measurement of estimated back-EMF voltage $V_B(t)$ and the application of braking signal $x_{BRK}(t)$ may occur at different times. In such other embodiments, piecewise periods of sensing and braking may lead to a desired minimization of settling time.

Furthermore, in some embodiments, braking subsystem 310 may appropriately limit braking signal $x_{BRK}(t)$ so as to not exceed allowable operational ranges for parameters associated with electromagnetic load 301 (e.g., to ensure a maximum voltage and maximum current applied to electromagnetic load 301 does not exceed maximum ratings of electromagnetic load 301).

In addition, while the foregoing contemplates braking subsystem 310 generating a piecewise square braking signal $x_{BRK}(t)$, in some embodiments, braking subsystem 310 may generate pieces of braking signal $x_{BRK}(t)$ to have any suitable waveform shape provided such shape and amplitude thereof serve to reduce a velocity of the moving mass of electromagnetic load 301.

In these and other embodiments, braking subsystem 310 may also be configured to compensate for undesired effects that may lead to measurement inaccuracy. For example, in some embodiments, braking subsystem 310 may determine a measurement offset for estimated back-EMF voltage $V_B(t)$ by measuring estimated back-EMF voltage $V_B(t)$ when driving signal V(t) is set to zero, and add a compensation factor to its measurements of estimated back-EMF voltage $V_B(t)$ to counter such offset. As another example, in these and other embodiments, braking subsystem 310 may compensate for noise in measurement of estimated back-EMF voltage $V_B(t)$ by applying filtering (e.g., low-pass filtering) to measurements of estimated back-EMF voltage $V_B(t)$.

In addition or alternatively to providing a braking signal $x_{BRK}(t)$ for minimizing settling time after driving of a playback waveform, in some embodiments, braking subsystem 310 may also be configured to, in the absence of a playback waveform provided to signal generator 324, use estimated back-EMF voltage $V_B(t)$ (which as described above, may be proportional to velocity of an electromagnetic load) to determine if undesired movement of electromagnetic load 301 is occurring, and apply braking signal $x_{BRK}(t)$ to reduce or eliminate such undesired motion. An example method 500 for reducing or eliminating such undesired motion is described below with respect to FIG. 5. An advantage of such approach is that processing subsystem 305 may be capable of detecting undesired movement of electromagnetic load 301 without using separate inertial measurement units (e.g., accelerometers) to detect such undesired movements.

Figure 5:
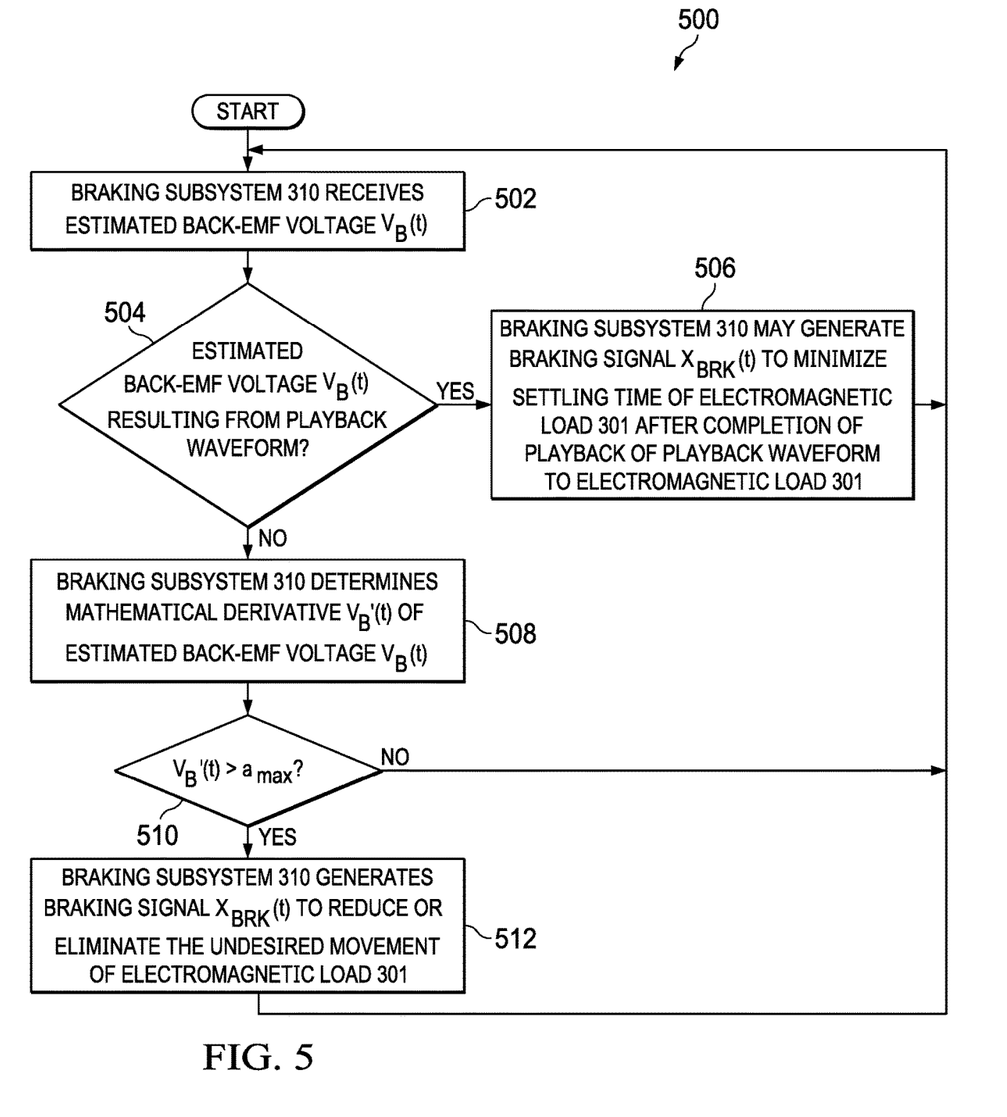
FIG. 5 illustrates a flow chart of an example method for restricting undesired movements of a haptic transducer, in accordance with embodiments of the present disclosure.

FIG. 5 illustrates a flow chart of an example method 500 for restricting undesired movements of a haptic transducer, in accordance with embodiments of the present disclosure. According to some embodiments, method 500 may begin at step 502. As noted above, teachings of the present disclosure may be implemented in a variety of configurations of host device 300A. As such, the preferred initialization point for method 500 and the order of the steps comprising method 500 may depend on the implementation chosen.

At step 502, braking subsystem 310 may receive estimated back-EMF voltage $V_B(t)$ from back-EMF estimate block 308. At step 504, braking subsystem 310 may determine whether the estimated back-EMF voltage $V_B(t)$ resulted from a playback waveform being input to signal generator 324. If the estimated back-EMF voltage $V_B(t)$ resulted from a playback waveform being input to signal generator 324, method 500 may proceed to step 506. Otherwise, if the estimated back-EMF voltage $V_B(t)$ resulted despite an absence of a playback waveform being input to signal generator 324, method 500 may proceed to step 508.

At step 506, responsive to the estimated back-EMF voltage $V_B(t)$ resulting from a playback waveform being input to signal generator 324, braking subsystem 310 may generate braking signal $x_{BRK}(t)$ to minimize settling time of electromagnetic load 301 after completion of playback of the playback waveform to electromagnetic load 301. After completion of step 506, method 500 may proceed again to step 502.

At step 508, responsive to the estimated back-EMF voltage $V_B(t)$ resulting despite an absence of a playback waveform being input to signal generator 324, braking subsystem 310 may determine a time rate of change of estimated back-EMF voltage $V_B(t)$, which may be proportional to an acceleration of a moving mass of electromagnetic load 301. To illustrate, estimated velocity $u(t)$ of electromagnetic load 301 may be determined from the relationship:

$$V_B(t)=Bl \cdot u(t)$$

where Bl is the magnetic force factor of the coil of electromagnetic load 301. Because acceleration $a(t)$ of a moving mass may be given by the mathematical derivative of its velocity with respect to time (e.g., $a(t)=du(t)/dt$), the mathematical derivative of estimated back-EMF voltage $V_B(t)$ with respect to time may be proportional to acceleration $a(t)$ of a moving mass of electromagnetic load 301. In some embodiments, braking subsystem 310 may implement a differentiator (e.g., a first-order high-pass circuit) to determine the mathematical derivative $V_B'(t)$ of estimated back-EMF voltage $V_B(t)$ with respect to time.

At step 510, braking subsystem 310 may compare mathematical derivative $V_B'(t)$ to a pre-determined acceleration threshold $a_{max}$. In some embodiments, mathematical derivative $V_B'(t)$ may be scaled by magnetic force factor Bl prior to being compared to pre-determined acceleration threshold $a_{max}$. If mathematical derivative $V_B'(t)$ exceeds acceleration threshold $a_{max}$, method 500 may proceed to step 512. Otherwise, method 500 may proceed again to step 502.

At 512, responsive to mathematical derivative $V_B'(t)$ exceeding acceleration threshold $a_{max}$, braking subsystem 310 may generate braking signal $x_{BRK}(t)$ to reduce or eliminate the undesired movement of electromagnetic load 301. In some embodiments, braking subsystem 310 may generate braking signal $x_{BRK}(t)$ as a piecewise square signal as described above and depicted in FIG. 4 and in the '238 application.

Although FIG. 5 discloses a particular number of steps to be taken with respect to method 500, method 500 may be executed with greater or fewer steps than those depicted in FIG. 5. In addition, although FIG. 3 discloses a certain order of steps to be taken with respect to method 500, the steps comprising method 500 may be completed in any suitable order.

Method 500 may be implemented in whole or part using host device 300A and/or any other system operable to implement method 500. In certain embodiments, method 500 may be implemented partially or fully in software and/or firmware embodied in computer-readable media.

Figure 6:
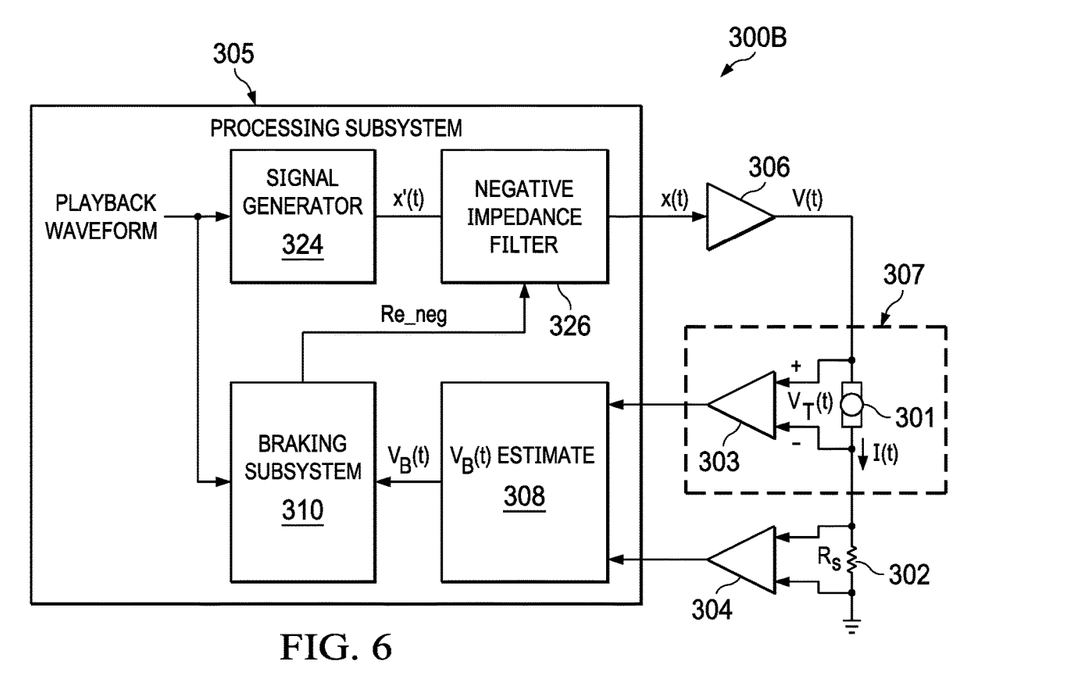
FIG. 6 illustrates selected components of another example host device incorporating force sensing using an electromagnetic load of the host device, in accordance with embodiments of the present disclosure.

FIG. 6 illustrates selected components of another example host device 300B incorporating force sensing using an electromagnetic load 301 of host device 300B, in accordance with embodiments of the present disclosure. Host device 300B may include, without limitation, a mobile device, home appliance, a vehicle, and/or any other system, device, or apparatus that includes a human-machine interface. In some embodiments, host device 300B of FIG. 6 may be similar in many respects to host device 300A of FIG. 3. Accordingly, only certain differences between host device 300B of FIG. 6 and host device 300A of FIG. 3 may be described below.

As shown in FIG. 6, rather than generating transducer waveform signal $x(t)$ as was the case in host device 300A, signal generator 324 in host device 300B may generate a raw transducer waveform signal $x'(t)$ which may be filtered by negative impedance filter 326 to generate transducer waveform signal $x(t)$ for driving amplifier 306. Negative impedance filter 326 may, when applied to raw transducer waveform signal $x'(t)$, reduce an effective quality factor q of electromagnetic load 301, which may in turn decrease ringing occurring after raw transducer driving signal $x'(t)$ has ended or to reduce or eliminate movements of a moving mass of electromagnetic load 301 caused by motion induced upon host device 300B.

In operation, rather than generating braking signal $x_{BRK}(t)$ as shown in FIG. 3, braking system 310 in host device 300B may generate a negative DC resistance signal Re_neg to partially or fully offset DC resistance Re of electromagnetic load 301 described above, thus effectively decreasing DC resistance Re and decreasing quality factor q of electromagnetic load 301. Examples of implementing negative impedance filter 326 or using a negative impedance to decrease quality factor q of an electromagnetic load are described in U.S. patent application Ser. No. 16/369,556, filed Mar. 29, 2019, and titled "Driver Circuitry" as well as U.S. patent application Ser. No. 16/816,790, filed Mar. 12, 2020, and titled "Methods and Systems for Improving Transducer Dynamics," both of which are incorporated by reference herein in their entireties.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for minimizing undesired movement of a moving mass of an electromagnetic load, comprising:
   detecting undesired movement of the moving mass based on real-time measurements of one or more parameters associated with the electromagnetic load; and
   responsive to detecting undesired movement of the moving mass, affecting a signal applied to the moving mass to reduce the undesired movement by generating a braking signal to be applied to the moving mass to reduce a velocity of the moving mass.

2. The method of claim 1, wherein the braking signal opposes a polarity of the velocity of the moving mass.

3. The method of claim 1, wherein generating the braking signal comprises adapting a polarity and a magnitude of the braking signal over time.

4. The method of claim 3, further comprising synchronizing the adaptation of the polarity and the magnitude of the braking signal based on when the magnitude of the velocity with respect to time crosses zero.

5. The method of claim 1, wherein generating the braking signal comprises scaling a magnitude of the braking signal to a magnitude of the velocity.

6. The method of claim 1, wherein the one or more parameters associated with the electromagnetic load comprises a back-electromotive force associated with the electromagnetic load.

7. The method of claim 6, further comprising:
   determining a derivative with respect to time of the back-electromotive force; and
   responsive to the derivative with respect to time of the back-electromotive force exceeding an acceleration threshold, affecting the signal applied to the moving mass to reduce the undesired movement.

8. The method of claim 6, wherein:
   affecting the signal applied to the moving mass comprises generating the braking signal to be applied to the moving mass to reduce a velocity of the moving mass;
   wherein generating the braking signal comprises scaling a magnitude of the braking signal to a derivative with respect to time of the back-electromotive force at a time in which the back-electromotive force as a function of time is approximate to zero.

9. The method of claim 8, wherein affecting the signal applied to the moving mass comprises reducing an effective impedance of the electromagnetic load.

10. The method of claim 9, wherein reducing the effective impedance comprises implementing a negative impedance filter applied to a signal for driving the electromagnetic transducer that reduces the effective impedance.

11. The method of claim 1, wherein the electromagnetic load comprises a haptic transducer.

12. A method for minimizing undesired movement of a moving mass of an electromagnetic load, comprising:
   detecting undesired movement of the moving mass based on real-time measurements of one or more parameters associated with the electromagnetic load;
   determining a velocity as a function of time of the moving mass based on the real-time measurements;
   from the velocity, determining an acceleration as a function of time of the moving mass; and
   responsive to the acceleration exceeding an acceleration threshold, affecting the signal applied to the moving mass to reduce the undesired movement.

13. A system for minimizing undesired movement of a moving mass of an electromagnetic load, comprising:
  one or more inputs for receiving real time measurements of one or more parameters associated with the electromagnetic load; and
  a processing subsystem configured to:
    detect undesired movement of the moving mass based on real-time measurements of one or more parameters associated with the electromagnetic load; and
    responsive to detecting undesired movement of the moving mass, affect a signal applied to the moving mass to reduce the undesired movement by generating a braking signal to be applied to the moving mass to reduce a velocity of the moving mass.

14. The system of claim 13, wherein the braking signal opposes a polarity of the velocity of the moving mass.

15. The system of claim 13, wherein generating the braking signal comprises adapting a polarity and a magnitude of the braking signal over time.

16. The system of claim 15, the processing subsystem further configured to synchronize the adaptation of the polarity and the magnitude of the braking signal based on when the magnitude of the velocity with respect to time crosses zero.

17. The system of claim 13, wherein generating the braking signal comprises scaling a magnitude of the braking signal to a magnitude of the velocity.

18. The system of claim 13, wherein the one or more parameters associated with the electromagnetic load comprises a back-electromotive force associated with the electromagnetic load.

19. The system of claim 18, the processing subsystem further configured to:
  determine a derivative with respect to time of the back-electromotive force; and
  responsive to the derivative with respect to time of the back-electromotive force exceeding an acceleration threshold, affect the signal applied to the moving mass to reduce the undesired movement.

20. The system of claim 18, wherein:
  affecting the signal applied to the moving mass comprises generating a braking signal to be applied to the moving mass to reduce a velocity of the moving mass;
  wherein generating the braking signal comprises scaling a magnitude of the braking signal to a derivative with respect to time of the back-electromotive force at a time in which the back-electromotive force as a function of time is approximate to zero.

21. The system of claim 20, wherein affecting the signal applied to the moving mass comprises reducing an effective impedance of the electromagnetic transducer.

22. The system of claim 21, wherein reducing the effective impedance comprises implementing a negative impedance filter applied to a signal for driving the electromagnetic transducer that reduces the effective impedance.

23. A system for minimizing undesired movement of a moving mass of an electromagnetic load, comprising:
  one or more inputs for receiving real time measurements of one or more parameters associated with the electromagnetic load; and
  a processing subsystem configured to:
    detect undesired movement of the moving mass based on real-time measurements of one or more parameters associated with the electromagnetic load; and
    determine a velocity as a function of time of the moving mass based on the real-time measurements;
    from the velocity, determine an acceleration as a function of time of the moving mass; and
    responsive to the acceleration exceeding an acceleration threshold, affect the signal applied to the moving mass to reduce the undesired movement.

24. The system of claim 13, wherein the electromagnetic load comprises a haptic transducer.

25. A host device comprising:
  an electromagnetic load;
  one or more inputs for receiving real time measurements of one or more parameters associated with the electromagnetic load; and
  a processing subsystem configured to:
    detect undesired movement of a moving mass of the electromagnetic load based on real-time measurements of one or more parameters associated with the electromagnetic load; and
    responsive to detecting undesired movement of the moving mass, affect a signal applied to the moving mass to reduce the undesired movement by generating a braking signal to be applied to the moving mass to reduce a velocity of the moving mass.

26. A host device comprising:
  an electromagnetic load;
  one or more inputs for receiving real time measurements of one or more parameters associated with the electromagnetic load; and
  a processing subsystem configured to:
    detect undesired movement of a moving mass of the electromagnetic load based on real-time measurements of one or more parameters associated with the electromagnetic load;
    determine a velocity as a function of time of the moving mass based on the real-time measurements;
    from the velocity, determine an acceleration as a function of time of the moving mass; and
    responsive to the acceleration exceeding an acceleration threshold, affect the signal applied to the moving mass to reduce the undesired movement.

* * * * *

UNITED STATES PATENT AND TRADEMARK OFFICE
CERTIFICATE OF CORRECTION

PATENT NO. : 12,244,253 B2
APPLICATION NO. : 16/850843
DATED : March 4, 2025
INVENTOR(S) : Khenkin et al.

It is certified that error appears in the above-identified patent and that said Letters Patent is hereby corrected as shown below:

In the Specification

1. In Column 4, Line 41, delete "$V_T(t) = V_B(r) + Re \cdot I(t) + Le \frac{dI(t)}{dt}$" and insert -- $V_T(t) = V_B(t) + Re \cdot I(t) + Le \cdot \frac{dI(t)}{dt}$ --, therefor.

In the Claims

2. In Column 10, Line 22, in Claim 4, delete "the magnitude of the velocity" and insert -- a magnitude of the velocity --, therefor.

3. In Column 10, Line 66, in Claim 12, delete "the signal" and insert -- a signal --, therefor.

4. In Column 11, Line 3, in Claim 13, delete "real time" and insert -- real-time --, therefor.

5. In Column 11, Lines 8-9, in Claim 13, delete "one or more parameters associated with the electromagnetic load;" and insert -- the one or more parameters associated with the electromagnetic load; --, therefor.

6. In Column 11, Line 23, in Claim 16, delete "the magnitude of the velocity" and insert -- a magnitude of the velocity --, therefor.

7. In Column 11, Line 42, in Claim 20, delete "a braking signal" and insert -- the braking signal --, therefor.

8. In Column 12, Line 5, in Claim 23, delete "real time" and insert -- real-time --, therefor.

Signed and Sealed this
Thirteenth Day of January, 2026

John A. Squires
*Director of the United States Patent and Trademark Office*

CERTIFICATE OF CORRECTION (continued)
U.S. Pat. No. 12,244,253 B2

9. In Column 12, Lines 10-11, in Claim 23, delete "one or more parameters associated with the electromagnetic load;" and insert -- the one or more parameters associated with the electromagnetic load; --, therefor.

10. In Column 12, Line 11, in Claim 23, after "load;", delete "and".

11. In Column 12, Line 17, in Claim 23, delete "the signal" and insert -- a signal --, therefor.

12. In Column 12, Line 23, in Claim 25, delete "real time" and insert -- real-time --, therefor.

13. In Column 12, Lines 29-30, in Claim 25, delete "one or more parameters associated with the electromagnetic load;" and insert -- the one or more parameters associated with the electromagnetic load; --, therefor.

14. In Column 12, Line 38, in Claim 26, delete "real time" and insert -- real-time --, therefor.

15. In Column 12, Lines 44-45, in Claim 26, delete "one or more parameters associated with the electromagnetic load;" and insert -- the one or more parameters associated with the electromagnetic load; --, therefor.

16. In Column 12, Line 51, in Claim 26, delete "the signal" and insert -- a signal --, therefor.